(12) United States Patent
Jia et al.

(10) Patent No.: US 9,527,068 B2
(45) Date of Patent: Dec. 27, 2016

(54) METHOD FOR PRODUCING HETEROGENEOUS CATALYSTS CONTAINING METAL NANOPARTICLES

(71) Applicant: Shubin, Inc., Los Altos, CA (US)

(72) Inventors: Jifei Jia, El Cerrito, CA (US); Jian Wang, San Mateo, CA (US); Kyle L. Fujdala, San Jose, CA (US)

(73) Assignee: Shubin, Inc., Los Altos, CA (US)

( * ) Notice: Subject to any disclaimer, the term of this patent is extended or adjusted under 35 U.S.C. 154(b) by 0 days.

(21) Appl. No.: 13/854,842

(22) Filed: Apr. 1, 2013

(65) Prior Publication Data

US 2014/0005041 A1    Jan. 2, 2014

Related U.S. Application Data

(63) Continuation of application No. 11/942,711, filed on Nov. 20, 2007, now abandoned.
(Continued)

(51) Int. Cl.
*B01J 21/00* (2006.01)
*B01J 23/00* (2006.01)
(Continued)

(52) U.S. Cl.
CPC .......... *B01J 37/0018* (2013.01); *B01D 53/945* (2013.01); *B01J 23/40* (2013.01); *B01J 23/42* (2013.01); *B01J 23/44* (2013.01); *B01J 23/63* (2013.01); *B01J 37/0203* (2013.01); *B01J 37/0215* (2013.01); *B01J 37/0248* (2013.01); *B01D 2255/1021* (2013.01); *B01D 2255/1023* (2013.01); *B01D 2255/206* (2013.01); *B01D 2255/2092* (2013.01); *B01D 2255/40* (2013.01); *B01D 2255/9207* (2013.01); *B01D 2257/404* (2013.01); *B01D 2257/406* (2013.01); *B01D 2257/502* (2013.01); *B01D 2257/702* (2013.01); *B01D 2258/012* (2013.01); *B01J 35/023* (2013.01); *B01J 37/0036* (2013.01); *B01J 37/16* (2013.01); *Y02T 10/22* (2013.01)

(58) Field of Classification Search
CPC .................................................. B01J 37/0213
See application file for complete search history.

(56) References Cited

U.S. PATENT DOCUMENTS 6,603,038 B1 * 8/2003 Hagemeyer et al. ...... 560/241.1
2004/0138060 A1 * 7/2004 Rapier et al. ................. 502/302

OTHER PUBLICATIONS

Yu et al(Polymers with Palladium Nanoparticles as Active Membrane Materials, J. App. Poly. Sci. (2004), vol. 92, 749-756).*
(Continued)

*Primary Examiner* — Melvin C Mayes
*Assistant Examiner* — Michael Forrest
(74) *Attorney, Agent, or Firm* — Patterson & Sheridan, LLP (57) ABSTRACT

A monomer is added to a solvent containing metal salt and porous support materials and the solvent is stirred for a period of time to distribute and fix the metal in the pores of the support materials. The solids that are dispersed in the solvent are then separated from the liquid, dried and calcined to form heterogeneous catalysts. The monomer that is added is of a type that can be polymerized in the solvent to form oligomers or polymers, or both. When forming heterogeneous catalysts containing platinum, acrylic acid is selected as the preferred monomer.

18 Claims, 7 Drawing Sheets

Related U.S. Application Data (60) Provisional application No. 60/866,566, filed on Nov. 20, 2006, provisional application No. 60/867,335, filed on Nov. 27, 2006.

(51) Int. Cl.
| | |
|---|---|
| *C01G 55/00* | (2006.01) |
| *B01J 37/00* | (2006.01) |
| *B01D 53/94* | (2006.01) |
| *B01J 23/40* | (2006.01) |
| *B01J 23/42* | (2006.01) |
| *B01J 23/44* | (2006.01) |
| *B01J 23/63* | (2006.01) |
| *B01J 37/02* | (2006.01) |
| *B01J 35/02* | (2006.01) |
| *B01J 37/16* | (2006.01) |

(56) References Cited

OTHER PUBLICATIONS

Manziek et al(Functionalized Emulsion and Suspension Polymer Particles: Nanoreactors for the Synthesis of Inorganic Materials. Chem Mater. 1998, 10, 3101-3108.).*

\* cited by examiner

METHOD FOR PRODUCING HETEROGENEOUS CATALYSTS CONTAINING METAL NANOPARTICLES

CROSS-REFERENCE TO RELATED APPLICATION

This application is a continuation of U.S. patent application Ser. No. 11/942,711, filed Nov. 20, 2007; which application claims the benefit of U.S. Provisional Patent Application Ser. No. 60/866,566, filed Nov. 20, 2006, and U.S. Provisional Patent Application Ser. No. 60/867,335, filed Nov. 27, 2006; each of the above referenced applications are herein incorporated by reference.

BACKGROUND OF THE INVENTION

Field of the Invention

The present invention generally relates to the production of supported catalysts, and more particularly, to a method for making a heterogeneous catalyst containing metal nanoparticles dispersed throughout the support material for the heterogeneous catalyst.

Description of the Related Art

Many industrial products such as fuels, lubricants, polymers, fibers, drugs, and other chemicals would not be manufacturable without the use of catalysts. Catalysts are also essential for the reduction of pollutants, particularly air pollutants created during the production of energy and by automobiles. Many industrial catalysts are composed of a high surface area support material upon which chemically active metal nanoparticles (i.e., nanometer sized metal particles) are dispersed. The support materials are generally inert, ceramic type materials having surface areas on the order of hundreds of square meters/gram. This high specific surface area usually requires a complex internal pore system. The metal nanoparticles are deposited on the support and dispersed throughout this internal pore system, and are generally between 1 and 100 nanometers in size.

Processes for making supported catalysts go back many years. One such process for making platinum catalysts, for example, involves the contacting of a support material such as alumina with a metal salt solution such as chloroplatinic acid. The salt solution "impregnates" or fills the pores of the support during this process. Following the impregnation, the support containing the salt solution would be air dried, causing the metal salt to precipitate within the pores. The support containing the crystallized metal salt would then be exposed to a hydrogen or carbon monoxide gas environment, reducing the solid metal salt to metal particles.

Another process for making supported catalysts involves the steps of contacting a support material with a metal salt solution and reducing the metal ions to metal particles in situ using suitable reducing agents. The following are examples of this process. U.K. Patent No. 1,282,138 teaches methods for preparing metal catalysts using different reducing agents, including glucose, hydroxylamine hydrochloride, and hydrazine. U.S. Pat. No. 4,086,275 teaches methods for preparing copper catalysts using sodium borohydride as the in situ reducing agent. U.S. Pat. No. 4,835,131 teaches methods for preparing molybdenum on silica catalyst, copper on gamma-alumina catalyst, silver on silica catalyst and silver on gamma-alumina catalyst. The reducing agents used to prepare these catalysts include hydrazine, ammonium hydroxide, and formaldehyde. U.S. Pat. Nos. 5,275,998 and 5,275,999 teach methods for preparing metal catalysts on carbon support and on alumina support using different reducing agents, including hydrazine hydrate, ascorbic acid, and sodium borohydride. According to these patents, supported catalysts having very small metal particle size (average size not greater than 2 nanometers) can be produced if the preparation steps are carried out in the presence of ethylene and/or acetylene (U.S. Pat. No. 5,275,998) or in the presence of carbon monoxide (U.S. Pat. No. 5,275,998). U.S. Pat. No. 6,686,308 teaches methods for preparing metal catalysts on silica using sodium citrate or potassium citrate as the reducing agent. This patent also teaches the use of colloid stabilizers including sodium sulfanilate, and discloses that it is preferable to use colloid stabilizers that can also act as reducing agents, namely ammonium citrate, potassium citrate, and sodium citrate.

SUMMARY OF THE INVENTION

The present invention provides additional methods for preparing supported metal catalysts. According to an embodiment of the present invention, a monomer is added to a solvent containing metal salt and porous support materials and the solvent is stirred for a period of time to precipitate and/or reduce the metal salt in the pores of the support materials. The solids that are dispersed in the solvent are then separated from the liquid, dried and calcined to form the supported catalyst. The monomer that is added to the solvent is of a type that can be polymerized in the solvent to form oligomers or polymers, or both. Acrylic acid may be used as such a monomer.

According to another embodiment of the present invention, a supported catalyst is prepared by first forming an interim supported metal catalyst through reduction or precipitation, and then carrying out the further steps of mixing the interim supported metal catalyst and metal salt of the same metal type in a solvent, adding a fixing agent to the solvent and stirring the solvent to precipitate or reduce the metal salt in the pores of the support materials for the catalyst, separating out the solid in the solvent, drying the separated solid, and calcining it. The fixing agent for causing the reduction or precipitation during the process for forming the interim supported metal catalyst is selected based on the particular metal-support combination being used. Likewise, the fixing agent that is added to the solvent is selected based on the particular metal-support combination being used.

According to still another embodiment of the present invention, a supported catalyst is prepared by first forming an interim supported metal catalyst through reduction or precipitation, and then carrying out the further steps of mixing the interim supported metal catalyst and metal salt of a different metal type in a solvent, adding a fixing agent to the solvent, stirring the solvent, separating out the solid in the solvent, drying the separated solid, and calcining it. At least one of the fixing agents for causing the reduction or precipitation during the process for forming the interim supported metal catalyst and the fixing agent that is added to the solvent is a monomer of a type that can be polymerized in the solvent to form oligomers or polymers, or both. Acrylic acid may be used as such a monomer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
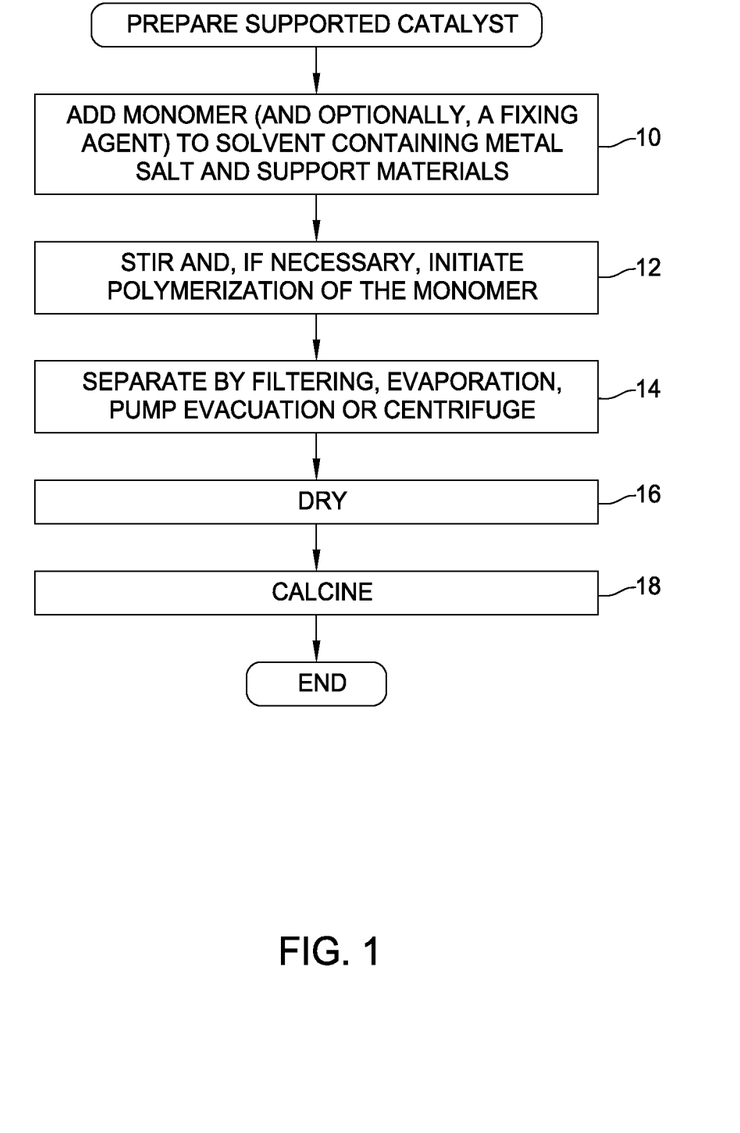
FIG. 1 is a process flow block diagram of a method for making catalysts according to a first embodiment of the present invention.

FIG. 1 shows a process flow block diagram of a method for making catalysts according to a first embodiment of the present invention. In step 10, a monomer is added to a solvent containing metal salt and support materials. The monomer that is added to the solvent is of a type that has some capability of interacting with the metal in the solvent and can be polymerized in the solvent to form oligomers or polymers, or both. Formation of oligomers and/or polymers in situ (i.e., in the free solvent and/or in the pores of the support material) is desirable because they help stabilize the growth of nanoparticles. Acrylic acid may be used as such a monomer, and is the preferred monomer for preparing platinum catalysts on alumina supports. Other types of monomers that could be used, depending on a particular metal-support combination, include vinyl pyrrolidone, vinyl acetate, acrylamide, acrylic anhydride, sodium acrylate, glycidyl methacrylate, methacrylic acid, methacrylic anhydride, methyl methacrylate, 2-aminoethyl methacrylate hydrochloride, 1-vinylimidazole, allylamine, diallylamine, 4-vinyl benzoic acid, 3-aminopropylmethyldiethoxysilane, 2-hydroxyethyl acrylate, 4-acetoxy styrene, and mixtures thereof.

In addition to the monomer, a fixing agent, which may be a reducing agent, a precipitating agent or a hybrid reducing-precipitating agent, may be added in step 10 to the solvent containing metal salt and support materials. Suitable fixing agents include: ascorbic acid, fumaric acid, acetic acid, maleic acid, $H_2$, CO, $N_2H_4$, $NH_2OH$, alcohols, citrates such as sodium, potassium and ammonium citrate, alkali metal borohydrides such as sodium and potassium borohydride, glycols, and mixtures thereof.

The solvent may be any liquid within which metal salt is suitably soluble, and which is sufficiently pure enough and can be removed from the support materials by evaporation, filtering, pump evacuation, centrifuge, or other similar means. Such solvents include, but are not limited to, water, alcohol, and other organic solvents. Preferably, water or double de-ionized water is used. Alcohols that are suitable include, but are not limited to, methanol and ethanol and their mixtures, with and without water. Other organic solvents include tetrahydrofuran, acetic acid, ethylene glycol, N-methylpyrrolidone, dimethylformamide, dimethylacetalmide, and their mixtures, with and without water.

The metal salt may include one or more of the following metals: Pt, Pd, Ru, Rh, Re, Ir, Os, Fe, Co, Ni, Cu, Ag, Au, Zn, Cd, In, Ga, Sn, Pb, Bi, Sb, Ti, Zr, Cr, Mo, W, V, Nb and Mn. Of the foregoing, soluble salts of Pt, Pd, Ru. Rh, Re, Cu, Au, Re, Ir, Os and Ag are preferable. Pt salts that are suitable include $Pt(NO_3)_2$, $(NH_3)_4Pt(NO_3)_2$, $H_2PtCl_6$, $K_2PtCl_4$, $(NH_3)_4Pt(OH)_2$, and $Cl_4Pt(NH_3)_2$. Ag and Cu salts that are suitable include $AgNO_3$, $AgCH_3COO$, $Cu(NO_3)_2$, $Cu(CH_3COO)_2$, and Cu(II)acetylacetonate. Pd salts that are suitable include $Pd(NH_3)_4(NO_3)_2$ and $Pd(NO_3)_2$. The concentration of the metal salt in the resulting solution is preferably between $10^{-4}$ M and 0.1 M. The concentration of the metal salt in the resulting solution will depend on the target weight loading of the final catalyst.

The support materials may be alumina, silica, oxides of vanadium, oxides of titanium, oxides of zirconium, oxides of iron, cerium oxides, carbon, zeolites, molecular sieves, and various combinations thereof. Any of these support materials may be doped with lanthanum, other rare earth elements, alkali metals, alkaline earth metals, sulfur, selenium, tellurium, phosphorus, arsenic, antimony, or bismuth. The doping of the support materials may be carried out prior to, during, or even after the processes shown in FIGS. 1-3.

The solvent containing the metal salt and the support materials may be prepared by first adding the support materials in powder form into the solvent and mixing the solvent. Sufficient agitation to keep the support materials in suspension within the solution is desirable. If necessary, the temperature may be adjusted during this step. Typically, ambient temperature or room temperature is used, within the range of 15 to 30° C. Metal salt is then added to the solvent in either dissolved form as part of a salt solution or solid form. After the metal salt is added in either dissolved form as part of a salt solution or solid form, the solvent is mixed. Sufficient agitation to keep the support materials in suspension is desirable. Agitation is also required to fully dissolve the metal salt within the solution and reduce any salt concentration gradients within the solution. Typically, ambient temperature or room temperature is used, within the range of 15 to 30° C. The pH and temperature of the solution may, however, be adjusted at this point, if desired. If the temperature or pH of the solution is adjusted, additional mixing is carried out.

Alternatively, the solvent containing the metal salt and the support materials may be prepared by first adding the metal salt in either dissolved form as part of a salt solution or solid form into the solvent and mixing the solvent for a time period, and then adding the support materials into the solvent. As another alternative, the metal salt and the support materials may be added to the solvent concurrently and then mixed together in the solvent.

After the monomer is added in step 10, the solvent is stirred (step 12). Sufficient agitation to keep the support materials in suspension is desirable. Mixing is carried out for a time period that is long enough to cause the precipitation and/or reduction of the metal salt in the pores of the support materials. During this step, based on the type of monomer that is added in step 10 and the conditions under which step 12 is carried out, the mixture may be heated or subjected to ultraviolet light, or polymerization initiators, such as AIBN or various types of peroxides, may be added to the mixture, so as to initiate or increase the polymerization of the monomer that is added in step 10.

In step 14, the support materials are separated from the solvent by any convenient method, such as evaporation, filtration, pump evacuation, or centrifuge. Then, in step 16, the separated support materials are dried at an elevated temperature between 100° C. and 150° C., preferably about 120° C. In step 18, the separated support materials are ground into fine powder and calcined in air at a temperature of 500° C. or higher. The calcination is typically carried out for 2 to 8 hours at the elevated temperature, and removes any organic residues such as any organic polymer that was formed in situ during step 12 and remaining in the pores of the separated support materials. The separated support materials that have been subjected to grinding and calcination in step 18 represent the finished supported catalyst.

Figure 2:
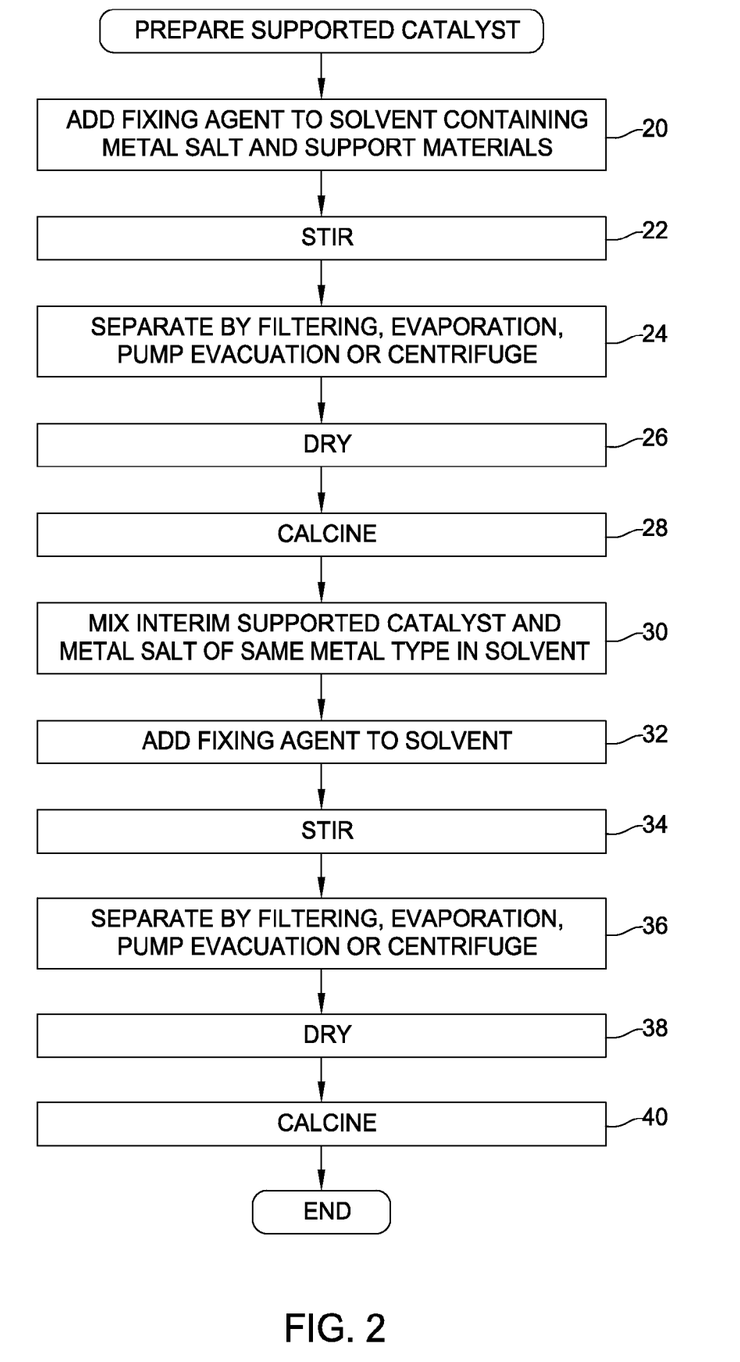
FIG. 2 is a process flow block diagram of a method for making catalysts according to a second embodiment of the present invention.

FIG. 2 shows a process flow block diagram of a method for making catalysts according to a second embodiment of the present invention. In step 20, a fixing agent, which may be a reducing agent, a precipitating agent or a hybrid reducing-precipitating agent, is added to a solvent containing metal salt and support materials. The solvent, metal salt, and support materials may be of any type described above in connection with the first embodiment. Also, the solvent containing metal salt and support materials is prepared in the manner described above for the first embodiment. Suitable fixing agents include a monomer, such as acrylic acid, vinyl pyrrolidone, vinyl acetate, acrylamide, acrylic anhydride, sodium acrylate, glycidyl methacrylate, methacrylic acid, methacrylic anhydride, methyl methacrylate, 2-aminoethyl methacrylate hydrochloride, 1-vinylimidazole, allylamine, diallylamine, 4-vinyl benzoic acid, 3-aminopropylmethyldiethoxysilane, 2-hydroxyethyl acrylate, 4-acetoxy styrene, and mixtures thereof, and others, such as ascorbic acid, fumaric acid, acetic acid, maleic acid, $H_2$, CO, $N_2H_4$, $NH_2OH$, alcohols, citrates such as sodium, potassium and ammonium citrate, alkali metal borohydrides such as sodium and potassium borohydride, glycols, and mixtures thereof.

After the fixing agent is added in step 20, the solvent is stirred (step 22). Sufficient agitation to keep the support materials in suspension is desirable. Mixing is carried out for a time period long enough to complete the precipitation and/or reduction of the metal salt in the pores of the support materials. In step 24, the support materials are separated from the solvent by any convenient method, such as evaporation, filtration, pump evacuation, or centrifuge. Then, in step 26, the separated support materials are dried at an elevated temperature between 100° C. and 150° C., preferably about 120° C. In step 28, the separated support materials are ground into fine powder and calcined in air at a temperature of 500° C. or higher. The calcination is typically carried out for 2 to 8 hours at the elevated temperature. The separated support materials that have been subjected to grinding and calcination in step 28 represent the interim supported catalyst.

After step 28, a portion of the separated support materials is mixed with a metal salt having the same metal type as the metal salt added in step 20 in a solvent (step 30). The solvent may be of any type described above in connection with the first embodiment. As described in the first embodiment, the support materials may be added first into the solvent, or the metal salt may be added first into the solvent, or the two may be added at about the same time into the solvent. Regardless of the order by which the support materials and the metal salt are added into the solvent, prior to step 32, the solvent is mixed sufficiently to keep the support materials in suspension within the solution and to fully dissolve the metal salt within the solution and reduce any salt concentration gradients within the solution. Typically, ambient temperature or room temperature is used, within the range of 15 to 30° C. The pH and temperature of the solution may, however, be adjusted at this point, if desired. If the temperature or pH of the solution is adjusted, additional mixing is carried out.

In step 32, a fixing agent, which may be a reducing agent, a precipitating agent or a hybrid reducing-precipitating agent, is added to the solvent. Suitable fixing agents include a monomer, such as acrylic acid, vinyl pyrrolidone, vinyl acetate, acrylamide, acrylic anhydride, sodium acrylate, glycidyl methacrylate, methacrylic acid, methacrylic anhydride, methyl methacrylate, 2-aminoethyl methacrylate hydrochloride, 1-vinylimidazole, allylamine, diallylamine, 4-vinyl benzoic acid, 3-aminopropylmethyldiethoxysilane, 2-hydroxyethyl acrylate, 4-acetoxy styrene, and mixtures thereof, and others, such as ascorbic acid, fumaric acid, acetic acid, maleic acid, $H_2$, CO, $N_2H_4$, $NH_2OH$, alcohols, citrates such as sodium, potassium and ammonium citrate, alkali metal borohydrides such as sodium and potassium borohydride, glycols, and mixtures thereof.

After the fixing agent is added in step 32, the solvent is stirred (step 34). Sufficient agitation to keep the support materials in suspension is desirable. Mixing is carried out for a time period that is long enough to complete the precipitation and/or reduction of the metal salt in the pores of the support materials. In step 36, the support materials are separated from the solvent by any convenient method, such as evaporation, filtration, pump evacuation, or centrifuge. Then, in step 38, the separated support materials are dried at an elevated temperature between 100° C. and 150° C., preferably about 120° C. In step 40, the separated support materials are ground into fine powder and calcined in air at a temperature of 500° C. or higher. The calcination is typically carried out for 2 to 8 hours at the elevated temperature. The separated support materials that have been subjected to grinding and calcination in step 40 represent the final supported catalyst.

In the second embodiment, steps 26 and 28 may be omitted. In such a case, the support materials that are separated from the solvent in step 24 represent the interim supported catalyst and a portion thereof is redispersed in a solvent and mixed with metal salt in step 30.

Figure 3:
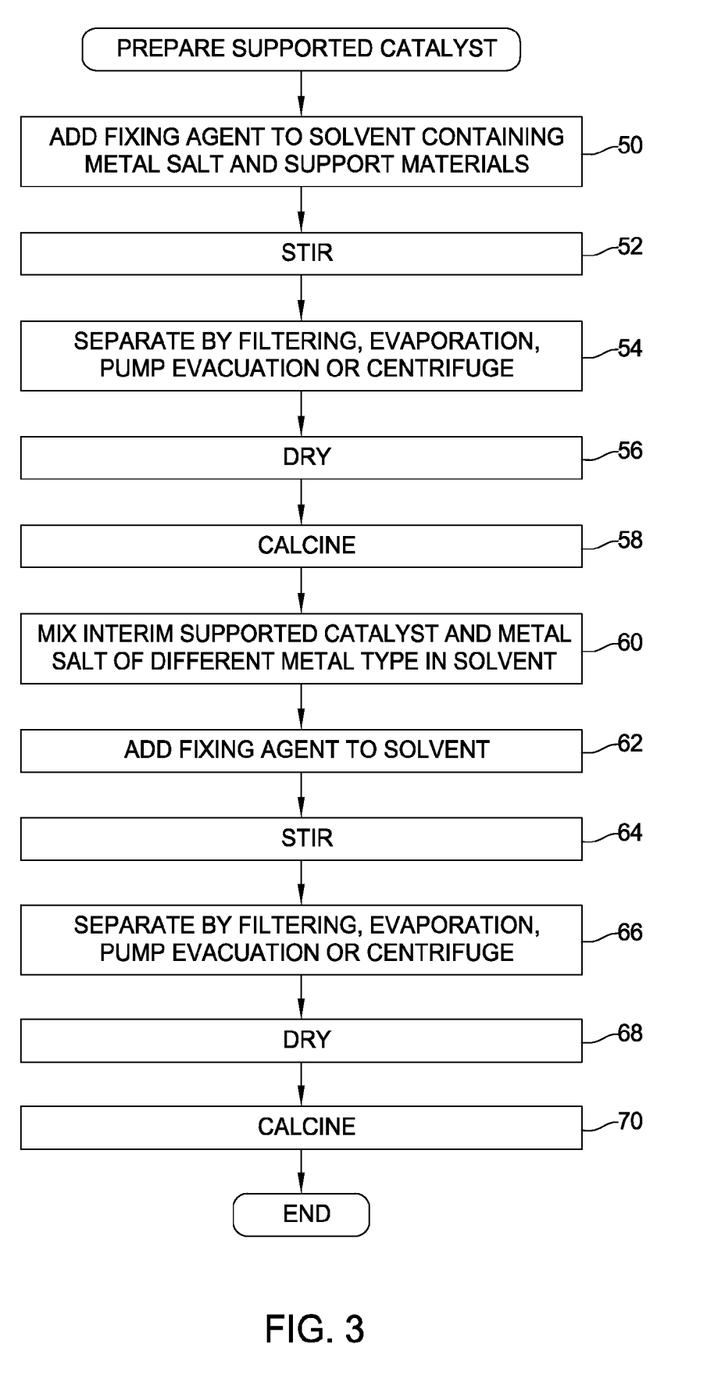
FIG. 3 is a process flow block diagram of a method for making catalysts according to a third embodiment of the present invention.

FIG. 3 shows a process flow block diagram of a method for making catalysts according to a third embodiment of the present invention. Steps 50, 52, 54, 56, 58, 60, 62, 64, 66, 68 and 70 correspond respectively to steps 20, 22, 24, 26, 28, 30, 32, 34, 36, 38 and 40 of the second embodiment and are carried out in the same manner, except for step 60. In step 60, metal salt having a metal type that is not the same as the metal salt in step 50 is mixed with the interim supported catalyst in a solvent. Also, in the third embodiment, at least one of the fixing agent added in step 50 and the fixing agent added in step 62 is a monomer of a type that has some capability of interacting with the metal in the solvent and can be polymerized in the solvent to form oligomers or polymers, or both. Acrylic acid may be used as such a monomer, and is the preferred monomer for preparing platinum catalysts on alumina supports. Other types of monomers that could be used, depending on a particular metal-support combination, include vinyl pyrrolidone, vinyl acetate, acrylamide, acrylic anhydride, sodium acrylate, glycidyl methacrylate, methacrylic acid, methacrylic anhydride, methyl methacrylate, 2-aminoethyl methacrylate hydrochloride, 1-vinylimidazole, allylamine, diallylamine, 4-vinyl benzoic acid, 3-aminopropylmethyldiethoxysilane, 2-hydroxyethyl acrylate, 4-acetoxy styrene, and mixtures thereof.

As with the second embodiment, in the third embodiment, steps 56 and 58 may be omitted. In such a case, the support materials that have been separated from the solvent in step 54 represent the interim supported catalyst and a portion thereof is redispersed in a solvent and mixed with metal salt in step 60.

Potential advantages of the method according to the second and third embodiments include: (1) the ability to synthesize catalysts with higher metal concentrations while maintaining high dispersions of metal particles; and (2) allowing use of different (potentially incompatible) metal salts and/or reducing agents to provide enhanced control over particle sizes and structure tuning.

FIGS. 4A-4D are schematic representations of different engine exhaust systems in which supported metal catalysts according to embodiments of the present invention may be used. The combustion process that occurs in an engine 102 produces harmful pollutants, such as CO, various hydrocarbons, particulate matter, and nitrogen oxides (NOx), in an exhaust stream that is discharged through a tail pipe 108 of the exhaust system.

Figure 4A:
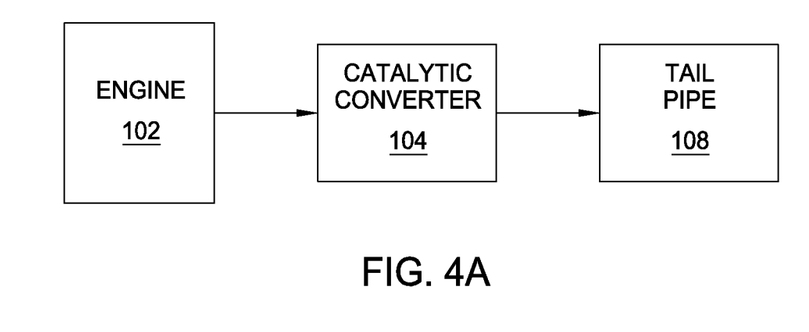
FIGS. 4A-4D are schematic representations of different engine exhaust systems in which catalysts made according to embodiments of the present invention may be used.

In the exhaust system of FIG. 4A, the exhaust stream from an engine 102 passes through a catalytic converter 104, before it is discharged into the atmosphere (environment) through a tail pipe 108. The catalytic converter 104 contains supported catalysts coated on a monolithic substrate that treat the exhaust stream from the engine 102. The exhaust stream is treated by way of various catalytic reactions that occur within the catalytic converter 104. These reactions include the oxidation of CO to form $CO_2$, burning of hydrocarbons, and the conversion of NO to $NO_2$.

Figure 4B:
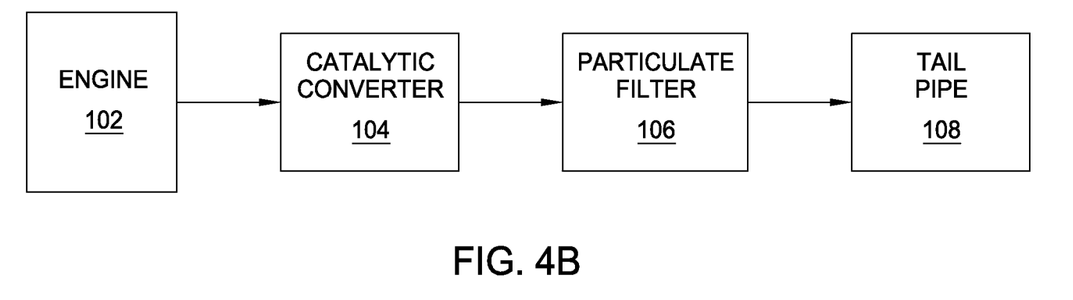

In the exhaust system of FIG. 4B, the exhaust stream from the engine 102 passes through a catalytic converter 104 and a particulate filter 106, before it is discharged into the atmosphere through a tail pipe 108. The catalytic converter 104 operates in the same manner as in the exhaust system of FIG. 4A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter.

Figure 4C:
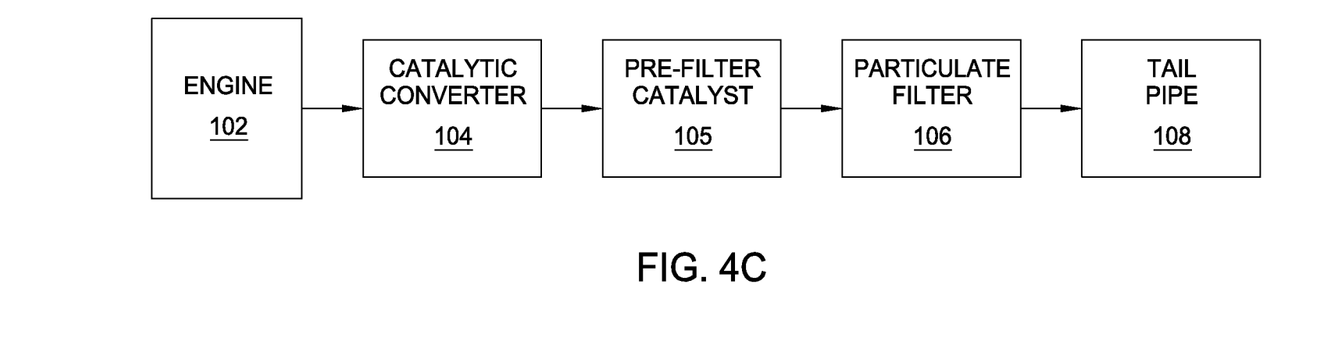

In the exhaust system of FIG. 4C, the exhaust stream from the engine 102 passes through a catalytic converter 104, a pre-filter catalyst 105 and a particulate filter 106, before it is discharged into the atmosphere through a tail pipe 108. The catalytic converter 104 operates in the same manner as in the exhaust system of FIG. 4A. The pre-filter catalyst 105 includes a monolithic substrate and supported catalysts coated on the monolithic substrate for the oxidation of NO. The particulate filter 106 traps particulate matter that is in the exhaust stream, e.g., soot, liquid hydrocarbons, generally particulates in liquid form.

Figure 4D:
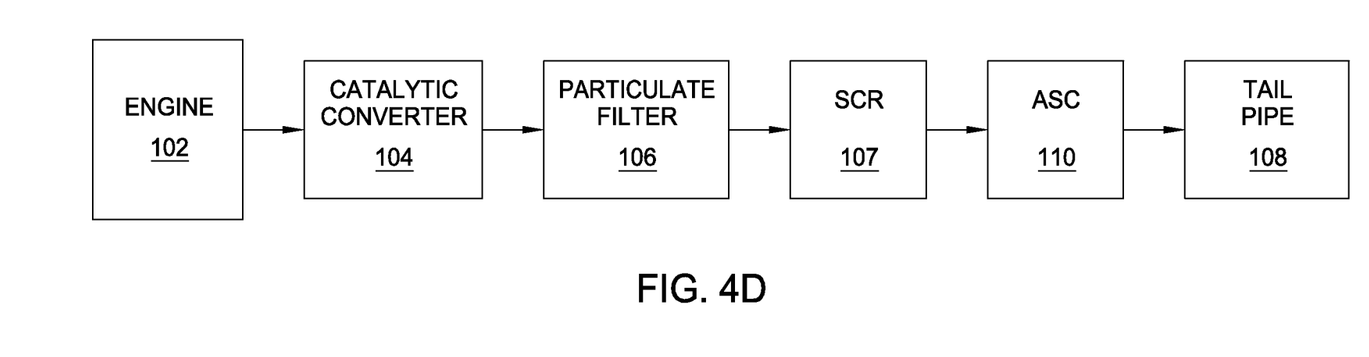

In the exhaust system of FIG. 4D, the exhaust stream passes from the engine 102 through a catalytic converter 104, a particulate filter 106, a selective catalytic reduction (SCR) unit 107 and an ammonia slip catalyst 110, before it is discharged into the atmosphere through a tail pipe 108. The catalytic converter 104 operates in the same manner as in the exhaust system of FIG. 4A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter. The SCR unit 107 is provided to reduce the NOx species to $N_2$. The SCR unit 107 may be ammonia/urea based or hydrocarbon based. The ammonia slip catalyst 110 is provided to reduce the amount of ammonia emissions through the tail pipe 108. An alternative configuration places the SCR unit 107 in front of the particulate filter 106.

Alternative configurations of the exhaust system includes the provision of SCR unit 107 and the ammonia slip catalyst 110 in the exhaust system of FIG. 4A or 1C, and the provision of just the SCR unit 107, without the ammonia slip catalyst 110, in the exhaust system of FIG. 4A, 4B or 4C.

As particulates get trapped in the particulate filter within the exhaust system of FIG. 4B, 4C or 4D, it becomes less effective and regeneration of the particulate filter becomes necessary. The regeneration of the particulate filter can be either passive or active. Passive regeneration occurs automatically in the presence of $NO_2$. Thus, as the exhaust stream containing $NO_2$ passes through the particulate filter, passive regeneration occurs. During regeneration, the particulates get oxidized and $NO_2$ gets converted back to NO. In general, higher amounts of $NO_2$ improve the regeneration performance, and thus this process is commonly referred to as $NO_2$ assisted oxidation. However, too much $NO_2$ is not desirable because excess $NO_2$ is released into the atmosphere and $NO_2$ is considered to be a more harmful pollutant than NO. The $NO_2$ used for regeneration can be formed in the engine during combustion, from NO oxidation in the catalytic converter 104, from NO oxidation in the pre-filter catalyst 105, and/or from NO oxidation in a catalyzed version of the particulate filter 106.

Active regeneration is carried out by heating up the particulate filter 106 and oxidizing the particulates. At higher temperatures, $NO_2$ assistance of the particulate oxidation becomes less important. The heating of the particulate filter 106 may be carried out in various ways known in the art. One way is to employ a fuel burner which heats the particulate filter 106 to particulate combustion temperatures. Another way is to increase the temperature of the exhaust stream by modifying the engine output when the particulate filter load reaches a pre-determined level.

The present invention provides embodiments of a supported metal catalyst that is to be used in the catalytic converter 104 shown in FIGS. 4A-4D, or generally as a catalyst in any vehicle emission control system, including as a diesel oxidation catalyst, a diesel filter catalyst, an ammonia-slip catalyst, an SCR catalyst, or as a component of a three-way catalyst.

Figure 5:
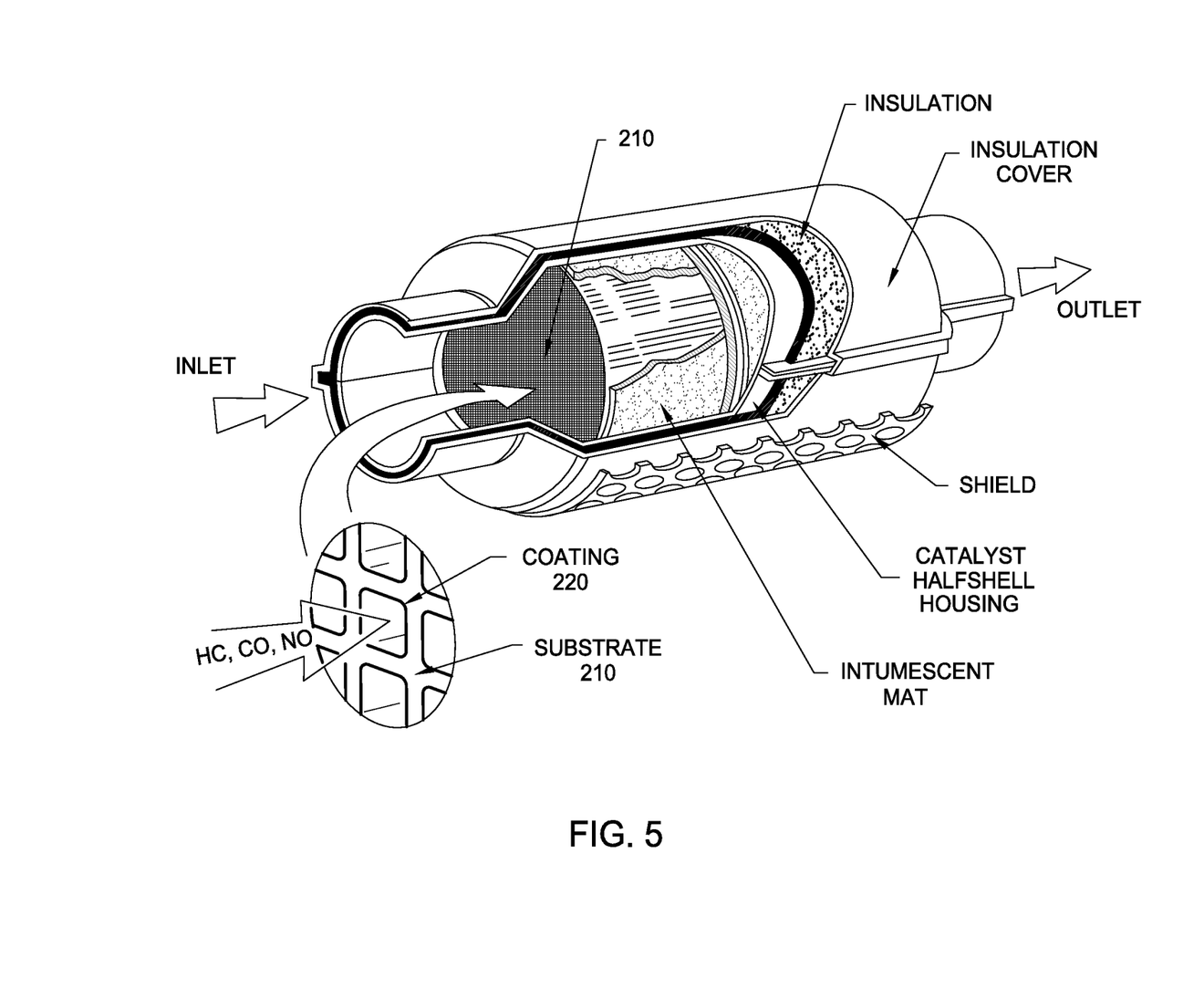
FIG. 5 is an illustration of a catalytic converter with a cut-away section that shows a substrate onto which catalysts made according to embodiments of the present invention are coated.

FIG. 5 is an illustration of a catalytic converter with a cut-away section that shows a substrate 210 onto which engine exhaust catalysts according to embodiments of the present invention are coated. The exploded view of the substrate 210 shows that the substrate 210 has a honeycomb structure comprising a plurality of channels into which engine exhaust catalysts are flowed in slurry form so as to form coating 220 on the substrate 210.

Figure 6:
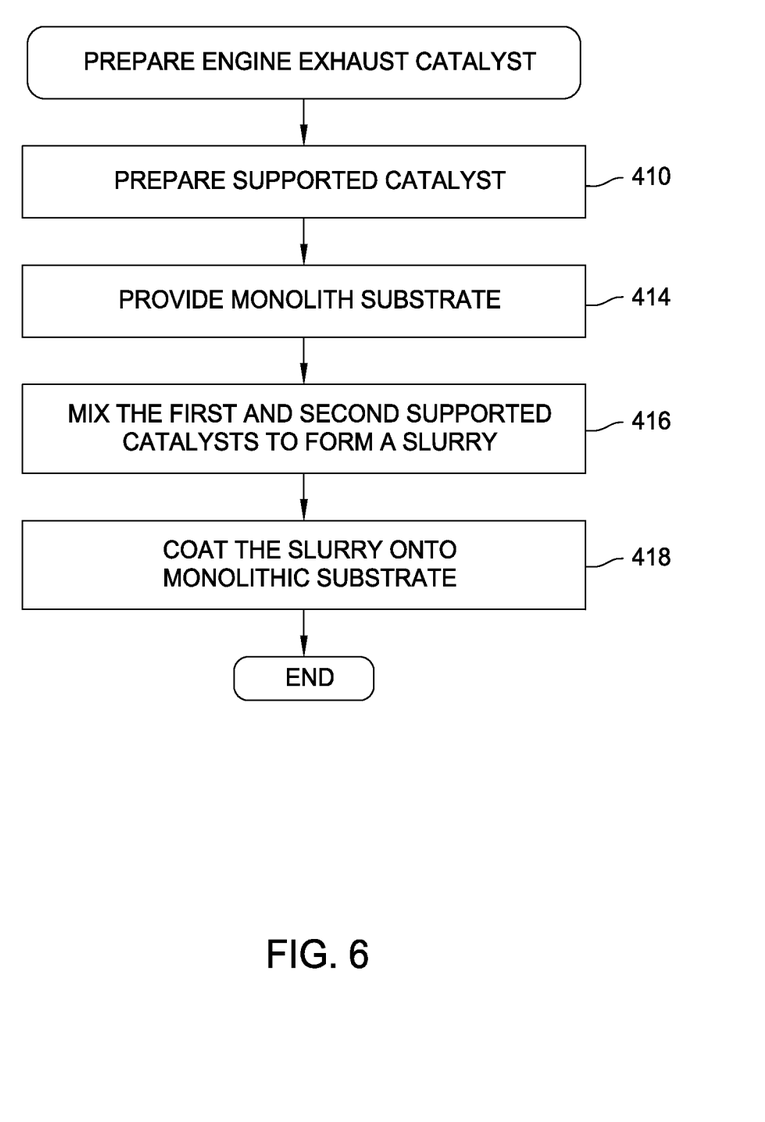
FIG. 6 is a flow diagram illustrating the steps for preparing an engine exhaust catalyst.

FIG. 6 is a flow diagram that illustrates the steps for preparing an engine exhaust catalyst using the substrate 210 of FIG. 5. In step 410, the supported metal catalyst, e.g., a platinum-palladium catalyst, is prepared. A monolithic substrate, such as substrate 210 shown in FIG. 5, is provided in step 414. Exemplary monolithic substrates include those that are ceramic (e.g., cordierite), metallic, or silicon carbide based. Then, the supported metal catalyst in powder form is mixed in a solvent to form a slurry (step 416) and the slurry is then coated onto the monolithic substrate (step 418).

The following examples serve to explain and illustrate the embodiments of the present invention.

Example 1

Pt (1%) on Alumina

Add 4 g of alumina (alumina having a BET surface area of 140 $m^2/g$) to 17 ml of $H_2O$ and stir for 20 minutes at room temperature. Add 1.0 ml of $Pt(NO_3)_2$ (40 mg/ml Pt) solution into the system and stir at room temperature for 60 minutes. Add 0.5 ml acrylic acid (having 99% purity) into the system and continue to stir at room temperature for 2 hours. Filter to separate out the solid from the system. Dry the separated solid at 120° C. for 2 hours, grind it into fine powder, and calcine it in air for 2 hours at a temperature of 500° C.

Example 2

Pt (3%) on Alumina

Add 4 g of alumina (alumina having a BET surface area of 140 $m^2$/g) to 17 ml of $H_2O$ and stir for 20 minutes at room temperature. Add 1.2 ml of $Pt(NO_3)_2$ (100 mg/ml Pt) solution into the system and stir at room temperature for 60 minutes. Add 1.5 ml acrylic acid (having 99% purity) into the system and continue to stir at room temperature for 2 hours. Filter to separate out the solid from the system. Dry the separated solid at 120° C. for 2 hours, grind it into fine powder, and calcine it in air for 2 hours at a temperature of 500° C.

Example 3

Pt (1%) on La-Doped Alumina

Add 4 g of La-doped alumina (alumina doped with 4% of $La_2O_3$ by weight having BET surface area of 200 $m^2$/g) to 19 ml of $H_2O$ and stir for 20 minutes at room temperature. Add 0.4 ml of $Pt(NO_3)_2$ (100 mg/ml Pt) solution into the system and stir at room temperature for 60 minutes. Add 0.5 ml acrylic acid (having 99% purity) into the system and continue to stir at room temperature for 2 hours. Filter to separate out the solid from the system. Dry the separated solid at 120° C. for 2 hours, grind it into fine powder, and calcine it in air for 2 hours at a temperature of 500° C.

Example 4

Pt (3%) on La-Doped Alumina

Add 4 g of La-doped alumina (alumina doped with 4% of $La_2O_3$ by weight having BET surface area of 200 $m^2$/g) to 17.3 ml of $H_2O$ and stir for 20 minutes at room temperature. Add 1.2 ml of $Pt(NO_3)_2$ (100 mg/ml Pt) solution into the system and stir at room temperature for 60 minutes. Add 1.5 ml acrylic acid (having 99% purity) into the system and continue to stir at room temperature for 2 hours. Filter to separate out the solid from the system. Dry the separated solid at 120° C. for 2 hours, grind it into fine powder, and calcine it in air for 2 hours at a temperature of 500° C.

Example 5

Pt (3%) on La-Doped Alumina

Add 4 g of La-doped alumina (alumina doped with 4% of $La_2O_3$ by weight having BET surface area of 200 $m^2$/g) to 17.3 ml of $H_2O$ and stir for 20 minutes at room temperature. Add 1.2 ml of $Pt(NO_3)_2$ (100 mg/ml Pt) solution into the system and stir at room temperature for 60 minutes. Add 1.5 ml acrylic acid (having 99% purity) into the system and continue to stir at room temperature for 10 minutes. Increase the temperature to 100° C. and stir for 1 hour, and then, decrease the temperature to room temperature. Filter to separate out the solid from the system. Dry the separated solid at 120° C. for 2 hours, grind it into fine powder, and calcine it in air for 2 hours at a temperature of 500° C.

Example 6

Pt (3%) on La-Doped Alumina

Add 4 g of La-doped alumina (alumina doped with 4% of $La_2O_3$ by weight having BET surface area of 200 $m^2$/g) to 15.3 ml of $H_2O$ and stir for 20 minutes at room temperature. Add 1.2 ml of $Pt(NO_3)_2$ (100 mg/ml Pt) solution into the system and stir at room temperature for 60 minutes. Add 1.5 ml acrylic acid (having 99% purity) into the system and continue to stir at room temperature for 10 minutes. Then, add 18 mg of 2,2-Azobisisobutyronitrile (AIBN) suspended in 2 ml of $H_2O$ into the system and continue to stir at room temperature for 60 minutes. Filter to separate out the solid from the system. Dry the separated solid at 120° C. for 2 hours, grind it into fine powder, and calcine it in air for 2 hours at a temperature of 500° C.

Example 7

Pt (1%) on La-Doped Alumina (Sequential Method)

Add 30 g of La-doped alumina (alumina doped with 4% of $La_2O_3$ by weight having BET surface area of 200 $m^2$/g) to 145 ml of $H_2O$ and stir for 20 minutes at room temperature. Add 1.5 ml of $Pt(NO_3)_2$ (100 mg/ml Pt) solution into the system and stir at room temperature for 60 minutes. Add 3.75 ml acrylic acid (having 99% purity) into the system and continue to stir at room temperature for 2 hours. Filter to separate out the solid from the system. Dry the separated solid at 120° C. for 2 hours, grind it into fine powder, and calcine it in air for 2 hours at a temperature of 500° C. After calcining the separated solid, add 4 g of it into 19.3 ml of $H_2O$ and stir for 20 minutes at room temperature. Add 0.2 ml of $Pt(NO_3)_2$ (100 mg/ml Pt) solution into the system and stir at room temperature for 60 minutes. Add 0.5 ml acrylic acid (having 99% purity) into the system and continue to stir at room temperature for 2 hours. Filter to separate out the solid from the system. Dry the separated solid at 120° C. for 2 hours, grind it into fine powder, and calcine it in air for 2 hours at a temperature of 500° C.

Example 8

Pt (3%) on La-Doped Alumina (Sequential Method)

Add 10 g of La-doped alumina (alumina doped with 4% of $La_2O_3$ by weight having BET surface area of 200 $m^2$/g) to 45 ml of $H_2O$ and stir for 20 minutes at room temperature. Add 1.5 ml of $Pt(NO_3)_2$ (100 mg/ml Pt) solution into the system and stir at room temperature for 60 minutes. Add 1.875 ml acrylic acid (having 99% purity) into the system and continue to stir at room temperature for 2 hours. Filter to separate out the solid from the system. Dry the separated solid at 120° C. for 2 hours, grind it into fine powder, and calcine it in air for 2 hours at a temperature of 500° C. After calcining the separated solid, add 4 g of it into 19.3 ml of $H_2O$ and stir for 20 minutes at room temperature. Add 0.6 ml of $Pt(NO_3)_2$ (100 mg/ml Pt) solution into the system and stir at room temperature for 60 minutes. Add 0.75 ml acrylic acid (having 99% purity) into the system and continue to stir at room temperature for 2 hours. Filter to separate out the solid from the system. Dry the separated solid at 120° C. for 2 hours, grind it into fine powder, and calcine it in air for 2 hours at a temperature of 500° C.

Example 9

Pt+Pd (1%) on Alumina

Add 30 g of alumina (alumina having a BET surface area of 140 m²/g) into 140 ml of $H_2O$ and stir for 20 minutes at room temperature. Add 1.5 ml of $Pt(NO_3)_2$ (100.0 mg/ml Pt) into the system and continue to stir at room temperature for 60 min. Add 3.75 ml of acrylic acid (having 99% purity) and stir at room temperature for 2 hours. Filter to separate out the solid from the system. Dry the separated solid at 130° C. for 90 minutes, grind it into fine powder, and calcine it in air for 2 hours at a temperature of 500° C. After calcining the separated solid, add 2 g of it into 9 ml of $H_2O$ and stir for 20 minutes at room temperature. Add 0.25 ml of $Pd(NO_3)_2$ (40 mg/ml Pd) and continue to stir at room temperature for 30 minutes. Add 0.662 g of ascorbic acid and stir at room temperature for 1 hour. Filter to separate out the solid from the system. Dry the separated solid at 130° C. for 150 minutes, grind it into fine powder, and calcine it in air for 1 hour at a temperature of 500° C.

Example 10

Pd+Pt (1%) on Alumina

Add 30 g of alumina (alumina having a BET surface area of 140 m²/g) into 140 ml of $H_2O$ and stir for 20 minutes at room temperature. Add 3.75 ml of $Pd(NO_3)_2$ (40 mg/ml Pd) and continue to stir at room temperature for 60 minutes. Add 9.93 g of ascorbic acid and stir at room temperature for 1 hour. Filter to separate out the solid from the system. Dry the separated solid at 130° C. for 150 minutes, grind it into fine powder, and calcine it in air for 1 hour at a temperature of 500° C. After calcining the separated solid, add 4 g of it into 18 ml of $H_2O$ and stir for 20 minutes at room temperature. Add 0.2 ml of $Pt(NO_3)_2$ (100.0 mg/ml Pt) into the system and continue to stir at room temperature for 60 min. Add 0.5 ml of acrylic acid (having 99% purity) and stir at room temperature for 1 hour. Filter to separate out the solid from the system. Dry the separated solid at 130° C. for 150 minutes, grind it into fine powder, and calcine it in air for 1 hour at a temperature of 500° C.

A commonly used metric for measuring catalytic efficiency of catalysts is the temperature at which 50% conversion of CO into $CO_2$ is observed. For simplicity, this temperature will be referred to herein as the T50 temperature. Likewise, the T20 temperature corresponds to the temperature at which 20% of CO will be oxidized into $CO_2$, and the T70 temperature corresponds to the temperature at which 70% of CO will be oxidized into $CO_2$. Generally, higher conversion is observed at higher temperatures and lower conversion is observed at lower temperatures.

The T20, T50, T70 temperatures of catalysts differ depending on the conditions under which the conversion of CO into $CO_2$ is observed. Therefore, they are determined under conditions that simulate the actual operating conditions of the catalyst as closely as possible. The supported catalysts produced in accordance with the embodiments of the present invention are useful as diesel exhaust catalysts, and thus their T20, T50, T70 temperatures have been determined under simulated diesel exhaust conditions, which were as follows. A gas mixture having the composition: CO (1000 ppm), $C_3H_8$ (105 ppm), $C_3H_6$ (245 ppm), NO (450 ppm), $CO_2$ (10%), $O_2$ (10%), and He (balance) is supplied into a fixed bed flow reactor containing 15 mg of catalyst powder mixed with 85 mg of $\alpha$-$Al_2O_3$ at a total flow rate of 300 ml/min. The reactor is heated from room temperature to 300° C. at 10° C./minute. As the reactor is heated, CO conversion (oxidation) was measured by use of mass spectrometry as a function of temperature. Hydrocarbon conversion (oxidation) was also measured as a function of temperature by use of mass spectrometry.

The tables below provide a comparison of the T20, T50, T70 temperatures of the supported catalysts produced in accordance with the embodiments of the present invention with the supported catalysts produced in accordance with the prior art synthesis techniques, including dilute impregnation with filtration (Prior Art I), in situ reduction using hydrazine as the reducing agent (Prior Art II), and incipient wetness (Prior Art III). The T20, T50, T70 temperatures for each catalyst sample were determined under simulated diesel exhaust conditions. Table 1 is a comparison of the T20, T50, T70 temperatures for a platinum catalyst having a Pt weight loading of 1% supported on alumina. Table 2 is a comparison of the T20, T50, T70 temperatures for a platinum catalyst having a Pt weight loading of 3% supported on alumina. Table 3 is a comparison of the T20, T50, T70 temperatures for a platinum catalyst having a Pt weight loading of 1% supported on a lanthanum-doped alumina. Table 4 is a comparison of the T20, T50, T70 temperatures for a platinum catalyst having a Pt weight loading of 3% supported on a lanthanum-doped alumina.

TABLE 1

| Synthesis Method | T20 (° C.) | T50 (° C.) | T70 (° C.) |
|---|---|---|---|
| Example 1 | 139 | 151 | 163 |
| Prior Art I | 195 | 200 | 204 |
| Prior Art II | 177 | 202 | 212 |
| Prior Art III | 188 | 195 | 199 |

TABLE 2

| Synthesis Method | T20 (° C.) | T50 (° C.) | T70 (° C.) |
|---|---|---|---|
| Example 2 | 139 | 151 | 161 |
| Prior Art I | 176 | 181 | 183 |
| Prior Art II | 160 | 166 | 170 |
| Prior Art III | 183 | 188 | 190 |

TABLE 3

| Synthesis Method | T20 (° C.) | T50 (° C.) | T70 (° C.) |
|---|---|---|---|
| Example 3 | 144 | 156 | 173 |
| Example 7 | 138 | 152 | 166 |
| Prior Art I | 204 | 210 | 215 |
| Prior Art II | 162 | 212 | 218 |
| Prior Art III | 200 | 208 | 212 |

TABLE 4

| Synthesis Method | T20 (° C.) | T50 (° C.) | T70 (° C.) |
|---|---|---|---|
| Example 4 | 123 | 134 | 139 |
| Example 5 | 116 | 129 | 134 |

TABLE 4-continued

| Synthesis Method | T20 (° C.) | T50 (° C.) | T70 (° C.) |
|---|---|---|---|
| Example 6 | 127 | 137 | 143 |
| Example 8 | 122 | 134 | 140 |
| Prior Art I | 182 | 188 | 191 |
| Prior Art II | 155 | 200 | 211 |
| Prior Art III | 180 | 187 | 190 |

According to the first embodiment of the present invention, a monomer of a type that has some capability of interacting with the metal in the solvent and can be polymerized in the solvent to form oligomers or polymers, or both, is added to the solvent containing the metal salt and support materials. Formation of oligomers and/or polymers in situ (i.e., in the solvent) is desirable because they help stabilize the growth of nanoparticles inside the pores of the support material. In Examples 1-4 and 7-8, acrylic acid is used as such a monomer and is added to the solvent containing the metal salt and support materials at room temperature, and the mixture is maintained at room temperature. Even at room temperature, the in situ polymerization of the acrylic acid has been observed. In Example 5, the temperature of the mixture was raised to 100° C. to cause further polymerization of the acrylic acid in the mixture. In Example 6, the temperature of the mixture was maintained at room temperature, but AIBN was added to the mixture to cause further polymerization of the acrylic acid in the mixture.

As a way to illustrate the advantages of in situ polymerization of a monomer, the T20, T50, T70 temperatures of the supported catalysts produced in accordance with Examples 4-6 are compared with the supported catalysts produced in accordance with the prior art synthesis techniques in which a pre-formed polymer is added to a solvent containing metal salt and support materials as a fixing agent for the metal. Table 5 is a comparison of the T20, T50, T70 temperatures for a platinum catalyst having a Pt weight loading of 3% supported on a lanthanum-doped alumina. In the Prior Art IV example, 2.0349 g of sodium polyacrylate (molecular weight=2100) was added to a solvent containing $Pt(NO_3)_2$ salt and lanthanum-doped alumina support materials as the pre-formed polymer and stirred at room temperature. In the Prior Art V example, 8.1394 g of sodium polyacrylate (molecular weight=2100) was added to a solvent containing $Pt(NO_3)_2$ salt and lanthanum-doped alumina support materials as the pre-formed polymer and stirred at room temperature.

TABLE 5

| Synthesis Method | T20 (° C.) | T50 (° C.) | T70 (° C.) |
|---|---|---|---|
| Example 4 | 123 | 134 | 139 |
| Example 5 | 116 | 129 | 134 |
| Example 6 | 127 | 137 | 143 |
| Prior Art IV | 124 | 137 | 143 |
| Prior Art V | 130 | 140 | 150 |

The advantages of in situ polymerization also are evident when the effectiveness of the catalysts for hydrocarbon oxidation is considered. Table 6 is a comparison of the effectiveness for hydrocarbon oxidation of the supported catalysts produced in accordance with Examples 4-6 against the effectiveness for hydrocarbon oxidation of the supported catalysts produced in accordance with the prior art synthesis techniques in which a pre-formed polymer is added to a solvent containing metal salt and support materials as a fixing agent for the metal. In Table 6, the T20_HC temperature corresponds to the temperature at which 20% of $C_3H_6$ is oxidized; the T50_HC temperature corresponds to the temperature at which 50% of $C_3H_6$ is oxidized; and the T70_HC temperature corresponds to the temperature at which 70% of $C_3H_6$ is oxidized.

TABLE 6

| Synthesis Method | T20_HC (° C.) | T50_HC (° C.) | T70_HC (° C.) |
|---|---|---|---|
| Example 4 | 152 | 164 | 176 |
| Example 5 | 153 | 163 | 166 |
| Example 6 | 152 | 162 | 171 |
| Prior Art IV | 173 | 193 | 198 |
| Prior Art V | 201 | 208 | 210 |

Example 11-3.0% Pt, 1.5% Pd Supported Catalyst

To 10 L of de-ionized $H_2O$ was added 1940 g of La-stabilized alumina (having a BET surface area of ~200 $m^2$ $g^{-1}$) followed by stirring for 30 minutes at room temperature. To this slurry was added 490.6 g of $Pt(NO_3)_2$ solution (12.23% $Pt(NO_3)_2$ by weight), followed by stirring at room temperature for 60 minutes. Acrylic acid (750 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. $min^{-1}$) to give a 3% Pt material.

To 9.25 L of de-ionized $H_2O$ was added 1822 g of the above 3% Pt material followed by stirring for 20 minutes at room temperature. To this slurry was added 194.4 g of $Pd(NO_3)_2$ solution (14.28% $Pd(NO_3)_2$ by weight), followed by stirring at room temperature for 60 minutes. An aqueous ascorbic acid solution (930 g in 4.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C. $min^{-1}$) to give a 3% Pt, 1.5% Pd material.

Example 12-2.0% Pt, 1.0% Pd Supported Catalyst

To 10 L of de-ionized $H_2O$ was added 2000 g of La-stabilized alumina (having a BET surface area of ~200 $m^2$ $g^{-1}$) followed by stirring for 30 minutes at room temperature. To this slurry was added 327.1 g of $Pt(NO_3)_2$ solution (12.23% $Pt(NO_3)_2$ by weight), followed by stirring at room temperature for 60 minutes. Acrylic acid (500 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. $min^{-1}$) to give a 2% Pt material.

To 9.5 L of de-ionized $H_2O$ was added 1900 g of the above 2% Pt material followed by stirring for 20 minutes at room temperature. To this slurry was added 135.3 g of $Pd(NO_3)_2$ solution (14.28% $Pd(NO_3)_2$ by weight), followed by stirring at room temperature for 60 minutes. An aqueous ascorbic acid solution (647.2 g in 3.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C. $min^{-1}$) to give a 2% Pt, 1% Pd material.

Example 13

Engine Exhaust Catalyst Having Supported Pt/Pd at 120 $g/ft^3$

The supported PtPd catalyst powder (2.0% Pt, 1.0% Pd) prepared above (Example 12) was made into a washcoat slurry via addition to de-ionized water, milling to an appropriate particle size (typically with a $d_{50}$ range from 3 to 7 µm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the final coated monolith with a precious metal (Pt+Pd) loading of 120 $g/ft^3$. The coated monolith was canned according to methods known in the art and tested for CO emissions using a certified testing facility on a light-duty diesel vehicle (model year 2005). The CO emissions, as measured from the tail pipe of the light-duty diesel vehicle using bag data from the standard European MVEG test, were observed to be 0.222 g/km.

While particular embodiments according to the invention have been illustrated and described above, those skilled in the art understand that the invention can take a variety of forms and embodiments within the scope of the appended claims.

We claim:

1. A method for producing a supported catalyst, comprising:
    mixing a metal oxide support material with a metal salt in a solvent;
    adding a monomer to the solvent containing metal salt and the metal oxide support materials, the monomer being of a type that can be polymerized in the solvent to form oligomers or polymers, or both;
    reducing the metal salt using the monomer by stirring the solvent containing the metal salt, the support materials and the monomer;
    separating the liquid from the solid in the solvent; and
    calcining the separated solid to produce the supported catalyst.

2. The method according to claim 1, wherein the monomer comprises acrylic acid.

3. The method according to claim 2, wherein the metal salt comprises platinum salt and the support materials are made of lanthanum-doped alumina.

4. The method according to claim 1, further comprising the step of adding a fixing agent that is not a monomer to the solvent containing metal salt and support materials.

5. The method according to claim 1, further comprising the step of heating the solvent containing the metal salt, the support materials and the monomer to increase the amount of polymerization of the monomer in the solvent.

6. The method according to claim 1, further comprising the step of adding a polymerization initiator into the solvent containing the metal salt, the support materials and the monomer to increase the amount of polymerization of the monomer in the solvent.

7. A method for producing a supported catalyst, comprising:
    adding a fixing agent to a first solvent containing metal salt of a predetermined metal type and support materials, stirring the first solvent to reduce the metal salt, and then separating out the support materials from the first solvent, wherein the fixing agent is a monomer configured to reduce or precipitate the metal salt;
    mixing a portion of the support materials separated out from the first solvent and metal salt of the predetermined metal type into a second solvent; and
    adding a fixing agent to the second solvent, stirring the second solvent, and then separating out the support materials from the second solvent; and
    calcining the support materials separated out from the second solvent to produce the supported catalyst.

8. The method according to claim 7, wherein the fixing agent added to the first solvent and the fixing agent added to the second solvent are monomers of a type that can be polymerized in the solvent to form oligomers or polymers, or both.

9. The method according to claim 8, wherein the monomer added to the first solvent and the monomer added to the second solvent comprise acrylic acid.

10. The method according to claim 9, wherein the metal salt comprises platinum salt.

11. The method according to claim 7, further comprising the step of calcining the support materials separated out from the first solvent prior to the step of mixing.

12. A method for producing a supported catalyst, comprising:
    adding a first fixing agent to a first solvent containing metal salt of a first metal type and support materials, stirring the first solvent to reduce the metal salt, and then separating out the support materials from the first solvent;
    mixing a portion of the support materials separated out from the first solvent and metal salt of a second metal type that is different from the first metal type into a second solvent; and
    adding a second fixing agent to the second solvent, stirring the second solvent, and then separating out the support materials from the second solvent; and
    calcining the support materials separated out from the second solvent to produce the supported catalyst,
    wherein at least one of the first and second fixing agents comprise a monomer configured to reduce, respectively, the metal salt of the first metal type and the metal salt of the second metal type.

13. The method according to claim 12, wherein the monomer is of a type that can be polymerized in the solvent to form oligomers or polymers, or both.

14. The method according to claim 12, wherein the first fixing agent added to the first solvent comprises acrylic acid and the metal salt comprises platinum salt.

15. The method of claim 1, further comprising precipitating the metal salt while stirring the solvent containing the metal salt, the support materials and the monomer.

16. The method according to claim 12, wherein the first fixing agent and the second fixing agent are different compounds.

17. The method according to claim 16, wherein one of the first fixing agent and the second fixing agent comprises acrylic acid.

18. The method according to claim 17, wherein the other one of the first fixing agent and the second fixing agent comprises ascorbic acid.

\* \* \* \* \*